United States Patent
Pavlov et al.

(10) Patent No.: US 7,801,681 B2
(45) Date of Patent: Sep. 21, 2010

(54) METHOD FOR PHASE AND AMPLITUDE CORRECTION IN CONTROLLED SOURCE ELECTROMAGNETIC SURVEY DATA

(75) Inventors: Dmitriy A. Pavlov, The Woodlands, TX (US); Dennis E. Willen, Houston, TX (US); James J. Carazzone, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 263 days.

(21) Appl. No.: 12/083,883

(22) PCT Filed: Sep. 25, 2006

(86) PCT No.: PCT/US2006/037386
§ 371 (c)(1),
(2), (4) Date: Apr. 21, 2008

(87) PCT Pub. No.: WO2007/053251
PCT Pub. Date: May 10, 2007

(65) Prior Publication Data
US 2009/0133870 A1    May 28, 2009

Related U.S. Application Data
(60) Provisional application No. 60/732,336, filed on Nov. 1, 2005.

(51) Int. Cl.
*G01V 1/40* (2006.01)
(52) U.S. Cl. .......................................... 702/7

(58) Field of Classification Search .................... 702/1, 702/2, 3, 4, 5, 6, 7, 8, 9, 10, 11, 12, 13, 14, 702/15, 16, 17, 18, 36, 38; 324/323, 328, 324/329, 336, 338, 339, 343, 347, 354, 359, 324/366, 371

See application file for complete search history.

(56) References Cited

U.S. PATENT DOCUMENTS

| 4,617,518 A | 10/1986 | Srnka |
| 2009/0043508 A1* | 2/2009 | MacGregor et al. ............ 702/6 |

OTHER PUBLICATIONS

Alumbaugh, D. L. et al. (1997) "3-D Massively Parallel Electromagnetic Inversion—Part II, Analysis of a Cross Well Experiment," *Geophysical J, Int.* 128, pp. 355-363.

Constable, S. C. et al. (1998) "Marine Magnetotellurics For Petroleum Exploration Part 1: A Sea-Floor Equipment System," *Geophysics* 63, pp. 816-825.

(Continued)

*Primary Examiner*—Aditya Bhat
(74) *Attorney, Agent, or Firm*—ExxonMobil Upstream Research Co. Law Dept.

(57) ABSTRACT

The method for correcting the phase of measured electric signals or magnetic signals of field data from a controlled source electromagnetic survey (CSES) by comparing the measured field data corresponding to a selected frequency to the simulated data for various signal source receiver offsets (71) and correcting the phases of the actual data based on the phase difference for a selected range of small signal offsets (76) based on a go-electric model.

17 Claims, 5 Drawing Sheets

OTHER PUBLICATIONS

Ellingsrud, S. et al. (2002) "Remote Sensing of Hydrocarbon Layers by Seabed Logging (SBL): Results From a Cruise Offshore Angola," *The Leading Edge* 21, pp. 972-982.

MacGregor, L. M. et al. (1998) "The RAMESSES Experiment—III. Controlled -Source Electromagnetic Sounding of the Reykjanes Ridge at 57° 45' N," *Geophys. J. Int.* 135, pp. 773-789.

Newman, G. A. (1995) "Frequency-Domain Modeling of Airborne Electromagnetic Responses Using Staggered Finite Differences," *Geophysical Prospecting*, 43, pp. 1021-1042.

Sheriff, R. E. (2002) *Encyclopedia Dictionary of Applied Geophysics, Society of Exploration Geophysicists*, Fourth edition, p. 22, 83 & 325.

Taner, M. et al. (1981) "Surface Consistent Corrections," *Geophysics* 46, pp. 17-22.

EP Standard Search No. RS 113260 dtd Apr. 25, 2006, 2 pages.

* cited by examiner

METHOD FOR PHASE AND AMPLITUDE CORRECTION IN CONTROLLED SOURCE ELECTROMAGNETIC SURVEY DATA

This application claims the benefit of U.S. Provisional Application No. 60/732,336 filed on Nov. 1, 2005.

FIELD OF THE INVENTION

This invention relates generally to the field of geophysical prospecting, and more particularly to controlled source electromagnetic ("CSEM") prospecting, including field delineation. Specifically, the invention is a method for correcting CSEM data for phase and amplitude errors.

BACKGROUND OF THE INVENTION

Controlled-source electromagnetic surveys are an important geophysical tool for evaluating the presence of hydrocarbon-bearing strata within the earth. CSEM surveys typically record the electromagnetic signal induced in the earth by a source (transmitter) and measured at one or more receivers. The behavior of this signal as a function of transmitter location, frequency, and separation (offset) between transmitter and receiver can be diagnostic of rock properties associated with the presence or absence of hydrocarbons. Specifically, CSEM measurements are used to determine the spatially-varying resistivity of the subsurface.

Figure 1:
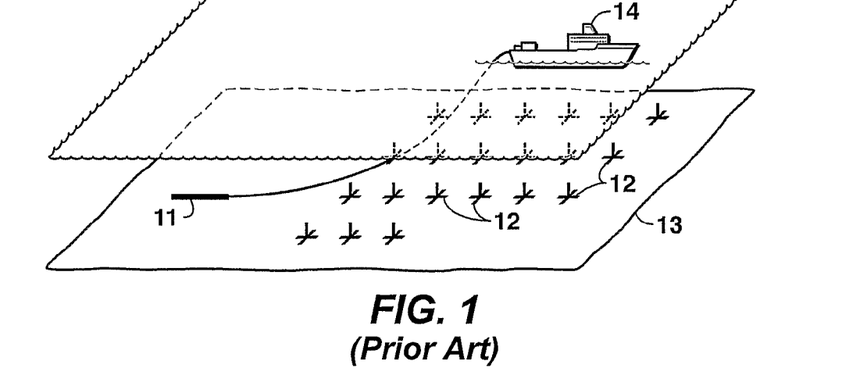
FIG. 1 illustrates deployment of equipment for a typical CSEM survey.

In the marine environment, CSEM data ("MCSEM" data) are typically acquired by towing an electric bipole transmitting antenna 11 among a number of receivers 12 positioned on the seafloor 13 (FIG. 1). The transmitter antenna is typically towed a few tens of meters above the seafloor. The receivers have multiple sensors designed to record one or more different vector components of the electric and/or magnetic fields. Alternative configurations include stationary transmitters on the seafloor or in the water column as well as magnetic transmitter antennae. The transmitting and receiving systems typically operate independently (without any connection), so that receiver data must be synchronized with shipboard measurements of transmitter position by comparing clock times on the receivers to time from a shipboard or GPS (Global Positioning System) standard.

Figure 2A:
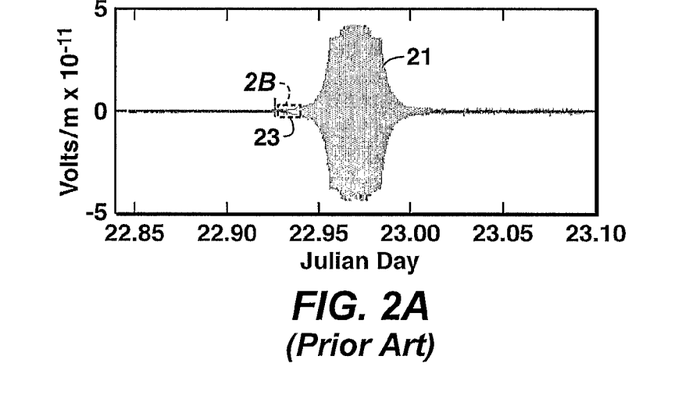
FIGS. 2A and 2B depict a received CSEM signal and the transmitter waveform that gave rise to it as functions of time.
Figure 2B:
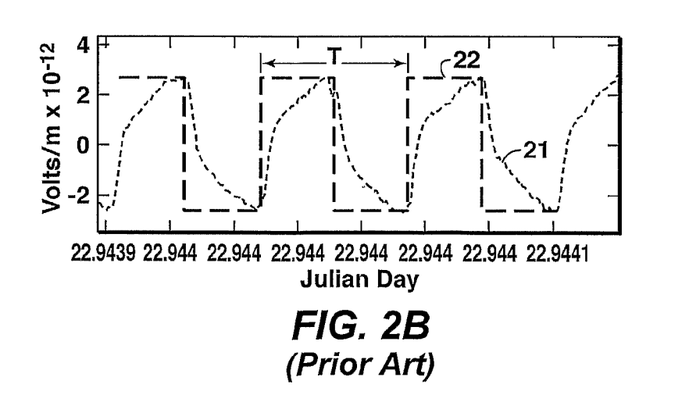

MCSEM data collected in deep water are typically interpreted in the temporal frequency domain, each signal representing the response of the earth to electromagnetic energy at that temporal frequency. In raw data, the strength of each frequency component varies depending on how much energy the transmitter broadcasts and on the receiver sensitivity at that frequency. These effects are typically removed from the data prior to interpretation. FIGS. 2A and 2B depict raw receiver data 21 together with (in FIG. 2B) the transmitter waveform 22 that gave rise to it. FIG. 2A shows examples of received CSEM signals on a time scale of several hours, while FIG. 2B shows the same received signal on a much shorter time scale 23, comparable to the period, T, of the transmitter waveform. Typical values for T are between 4 and 64 seconds. The transmitter waveform is depicted as a dashed line overlaying the receiver waveform. (The transmitter waveform is shown for reference only: the vertical scale applies only to the receiver signal.)

In practice, the receiver data are converted to temporal frequency by dividing (or "binning") the recorded time-domain data into time intervals equal to the transmitter waveform period (FIG. 3A) and determining the spectrum (FIG. 3B) within each bin ($x_1, x_2, x_3$) by standard methods based on the Fourier Transform. The phases of the spectral components are not shown. With each bin is associated a time, typically the Julian date at the center of the bin. Since the transmitter location is known as a function of time, these bins may be interchangeably labeled in several different ways including: by Julian date of the bin center; by transmitter position; by the signed offset distance between source and receiver; or by the cumulative distance traveled by the transmitter relative to some starting point.

Figure 3A:
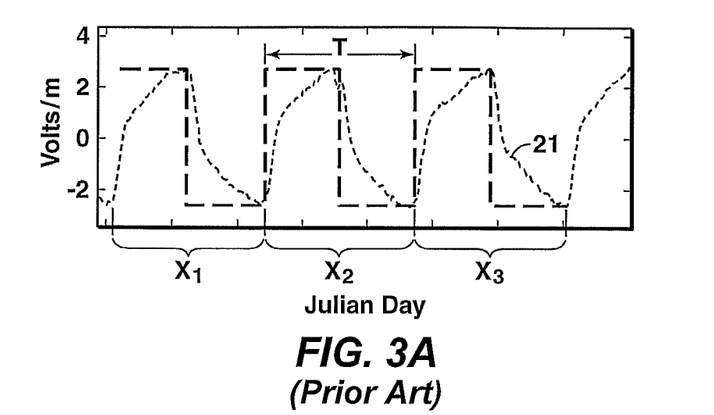

The transmitter signal may be a more complex waveform than that depicted in FIGS. 2B and 3A.

MCSEM receivers (FIG. 4) typically include:
- a power system, e.g. batteries (inside data logger and pressure case 40);
- one or more electric-field (E) or magnetic-field (B) antennae (bipoles 41 receive + and $-E_x$ fields, dipoles 42 + and $-E_y$, coils 43 for $B_x$ and coils 44 for $B_y$);
- other measuring devices, such as a compass and thermometer (not shown);
- electronics packages that begin sensing, digitizing, and storing these measurements at a pre-programmed time (inside case 40);
- a means to extract data from the receiver to a shipboard computer after the receiver returns to the surface (not shown);
- a weight (e.g., concrete anchor 49) sufficient to cause the receiver to fall to the seafloor; a mechanism 45 to release the receiver from its weight up receiving (acoustic release and navigation unit 46) an acoustic signal from a surface vessel (14 in FIG. 1);
- glass flotation spheres 47;
- strayline float 48; and
- various (not shown) hooks, flags, strobe lights, and radio beacons to simplify deployment and recovery of the receiver from a ship at the surface.

Figure 4:
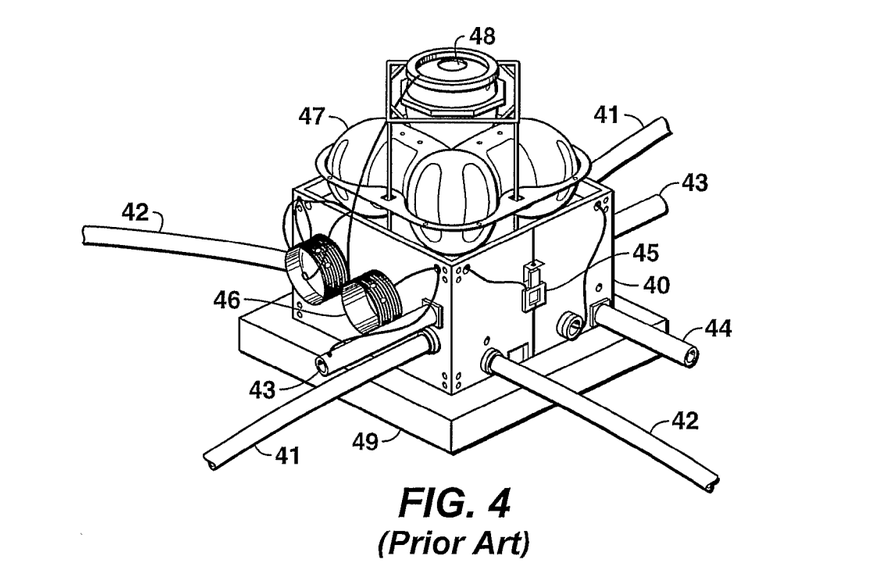
FIG. 4 depicts a 4-component ($E_x$, $E_y$, $B_x$ and $B_y$) seafloor CSEM receiver.

Clearly, other configurations are possible, such as connecting several receivers in a towed array (see, for example, U.S. Pat. No. 4,617,518 to Srnka). The receiver depicted in FIG. 4 is a 4-component ($E_x, E_y, B_x,$ and $B_y$) seafloor CSEM receiver. The devices can be configured to record different field types, including vertical electric ($E_z$) and magnetic ($B_z$) fields.

Figure 5:
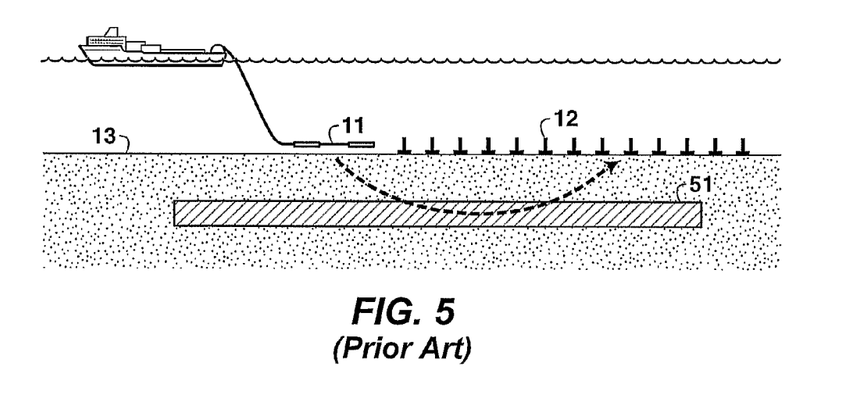
FIG. 5 depicts a cross section view of a typical MCSEM survey.
Figure 6A:
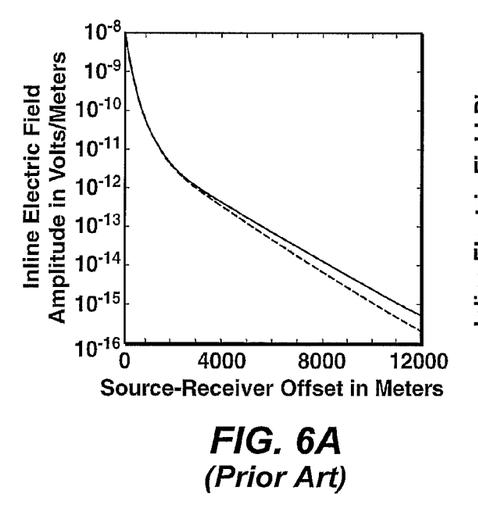
FIG. 6A shows a typical electric field amplitude response for a survey such as is depicted in FIG. 5.
Figure 6B:
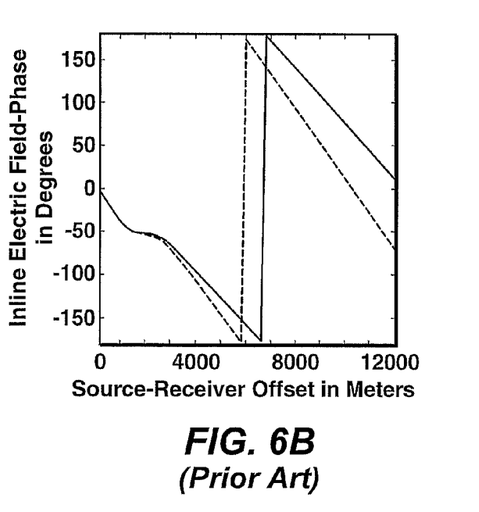
FIG. 6B shows the associated phase response.

In general, the received signals are made up of components both in-phase and out-of-phase with the transmitter signal. The signals are therefore conveniently represented as complex numbers in either rectangular (real-imaginary) or polar (amplitude-phase) form. As shown in FIGS. 5 and 6, both the phase and amplitude of MCSEM data can be indicative of resistive (and potentially hydrocarbon-bearing) strata. Both the phase and amplitude must be accurately determined in order to distinguish signal characteristics associated with hydrocarbons from the much larger portion of the signal that is associated with other geologic features of the subsurface. FIG. 5 shows a cross-section view of a typical MCSEM survey. The signal measured in a receiver 12 has contributions from many different paths through the subsurface, including paths associated with resistive (potentially hydrocarbon-bearing) strata such as 51. FIG. 6A shows Electric-field amplitude and FIG. 6B shows the corresponding phase responses that might result from the MCSEM measurements depicted in FIG. 5. The dashed curves show signals in the absence of the resistive unit 51. Signals in the presence of the resistive unit (solid curves) show a larger amplitude, as current is forced back toward the surface, and a delayed phase, due to the longer wavelengths of electromagnetic waves in the resistive unit.

Every CSEM signal frequency, $\omega$, measured in radians per second is associated with a signal period, $T=2\pi/\omega$, measured in seconds. Any phase value, φ, or phase shift, Δφ, is associated with an equivalent time shift, Δt, by the formula $$\Delta\phi = 2\pi(\Delta t/T).$$

While phase is customarily measured as an angle between 0 and 2π radians, it can be equivalently thought of as a time between 0 and T seconds.

While the amplitude and phase of MCSEM data can provide valuable constraints on the present or absence of hydrocarbons, each can be difficult to measure accurately in practice because of factors such as the following:

the transmitter current waveform must be accurately measured and reported from several hundreds or thousands of meters below the surface;

the responses of the receiver amplifiers must by accurately known at the frequencies where data are measured;

the receiver antennae (particularly the magnetic antennae) generally have a frequency-dependent response, and the response of the combined antennae-amplifier circuit can differ from the combined responses of the components;

small changes in the earth's resistivity close to the receiver may alter the electric and magnetic field values; and, the chemical interaction of the transmitting antenna electrodes with conductive and corroding seawater is not completely understood and may cause effects such as increased electrode resistance with usage.

Additionally, phase errors can arise because transmitter and receiver signals are recorded separately using different time bases (clocks) that must themselves be synchronized against a common GPS time base.

The problem of phase and amplitude errors has been recognized in published literature. Approaches to address the problem include:

Employing high-precision and temperature-compensated clocks in the seafloor receivers. Direct measurement of the drift (time error) of these clocks relative to a time reference (such as GPS) at the start and end of the survey allows the user to stretch or compress measured data to an estimate of the reference time (S. C. Constable, et al., "Marine magnetotellurics for petroleum exploration Part 1: A sea-floor equipment system," *Geophysics* 63, 816-825 (1998)).

Mounting an independent receiver to the transmitter to monitor the transmitter current that is actually injected into the water (L. M. MacGregor, et al., "The RAMESSES experiment—III. Controlled—source electromagnetic sounding of the Reykjanes Ridge at 57° 45' N,"

*Geophys. J Int.* 135, 773-789 (1998)). As before, the receiver data are corrected for the measured transmitter behavior.

Taking laboratory measurements of the response of the receiver's amplifier-antenna system (calibrating the receiver amplitude and phase versus frequency) and compensating field CSEM data for these values (S. Ellingsrud, et al., "Remote sensing of hydrocarbon layers by seabed logging (SBL): Results from a cruise offshore Angola," *The Leading Edge* 21, 972-982 (2002)).

Experience shows, however, that compensating clock drift, adjusting for transmitter variations, and applying receiver calibrations can leave residual phase and amplitude errors in the data—as judged by the inability to match the corrected data to synthetics from a realistic earth resistivity model. Furthermore, the combination of hardware and software needed to monitor the injected transmitter current is both costly and subject to breakdown as it must make real-time measurements (without interruption) while being dragged through the deep ocean. What is needed is a method that can be practiced as long as the transmitter continues to operate correctly, even if a monitoring system has failed. It should be noted, however, that the above-described techniques of compensating receiver clocks for drift, adjusting for transmitter variations, and applying receiver calibrations can be individually or collectively practiced with the present invention.

Application of timing corrections, measured transmitter current data, and receiver response functions improves the correspondence between real and simulated data significantly. Nevertheless phase differences of 5-10 degrees usually exist even after these corrections. Possible reasons for these are transmitter and/or receiver clock drift, instrument calibration issues, and localized resistivity anomalies in the near-surface.

These remaining errors in the data prevent an interpreter from developing a geoelectric model of the earth that will explain the data at all frequencies and all offsets. The ability to match field data to simulated data is critical in MCSEM interpretation, because the interpreter generally uses this method to infer the presence or absence of hydrocarbon reservoirs in the subsurface.

Additionally, these remaining errors can lead to errors in estimates of the subsurface resistivity when CSEM data are used for inversion or imaging. Inversion is an iterative method for determining the resistivity of the subsurface from CSEM data measured at the earth's surface or seafloor. See, for example, D. L. Alumbaugh and G. A. Newman, "3-D massively parallel electromagnetic inversion—Part II, Analysis of a cross well experiment," *Geophysical J, Int.* 128, 355-363 (1997). The result of inversion is a geo-electric model of the subsurface obtained by automatically updating a starting model of the earth resistivity to minimize the mismatch between measured and simulated data. Data errors could prevent the inversion process from converging to a reliable image of the subsurface.

Methods for correcting seismic data for amplitude and phase errors are not directly applicable to the CSEM problem because, at their core, all seismic methods estimate phase or timing errors from differences in arrival times or amplitudes of distinct seismic pulses. Distinctly arriving pulses do not generally appear in CSEM data, which is acquired at much lower frequencies, significant less bandwidth, and longer wavelengths than seismic data.

Correction methods for well log data are generally specific to measurements made in well bores and cannot be readily adapted to CSEM surveys. For example, sonic traveltime measurements in well bores are often corrected for tool tilt by averaging the traveltimes determined from transmitters above and below the receivers (R. E. Sheriff, *Encyclopedic Dictionary of Applied Geophysics, Society of Exploration Geophysicists*, Fourth edition, p. 325 (2002)). Density logs compensate for borehole irregularities and the effect of a mudcake on the borehole wall by contrasting the number of backscattered gamma rays measured by two detectors at different distances from the source (Sheriff, loc. cit, p. 83). Array-type induction logging tools compensate for formation invasion by drilling fluids by combining measurements made at different source-receiver spacings to respond preferentially to the resistivity at different distances from the center of the well bore (Sheriff, loc. cit., p. 22).

SUMMARY OF THE INVENTION

In one embodiment, the invention is a method for estimating error in measured data from a controlled-source electromagnetic survey of a subsurface region, comprising: (a)

selecting data from the electric or magnetic field survey data, said selected data corresponding to a plurality of different offsets (source-receiver spacings) and to a selected single frequency in the source's signal's frequency spectrum; (b) generating a geo-electrical model of the subsurface region, said model including at least resistivity or conductivity as a function of position in the region; (c) solving electromagnetic field equations to simulate the survey's electromagnetic responses for said selected frequency and for source and receiver locations corresponding to said selected data, using the geo-electrical model of the subsurface region and survey source parameters; (d) selecting a near-zero offset range; and (e) estimating data error at all offsets by comparing measured survey data to simulated data at least one offset within said selected range of near-zero offsets, said estimated error providing a means for correcting measured data.

BRIEF DESCRIPTION OF THE DRAWINGS

The present invention and its advantages will be better understood by referring to the following detailed description and the attached drawings in which:

FIGS. 3A and 3B illustrate the process of binning a receiver signal in time and determining the frequency spectrum within each time bin by Fourier analysis;

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

The present invention mitigates phase and/or amplitude errors in MCSEM surveys by exploiting the fact that marine electromagnetic data generated by the source near the receiver are dominated by the water conductivity and influenced to a lesser extent by the conductivity of the shallow sediments. The conductivity of seawater is usually in the neighborhood of 3.3 S/m and can often be measured directly while the conductivity of the shallow sediments can be adjusted to best match the data across multiple frequencies. Moreover, when the electric bipole transmitter approaches zero offset from the receiver, the electric field parallel to the transmitter bipole should approach zero phase relative to the transmitter and approach infinite amplitude. This provides a means to determine the required amplitude and phase correction using numerical modeling on a computer, since an earth model with the correct water conductivity and approximately correct sediment conductivity will give rise to synthetic data with the correct amplitude and phase near the transmitter. The present invention provides a method to correct field MCSEM data based on 3D modeling. After correction, the data become consistent with underlying physics of electromagnetic fields which is, in turn, used to simulate data from the geo-electric model.

Figure 7:
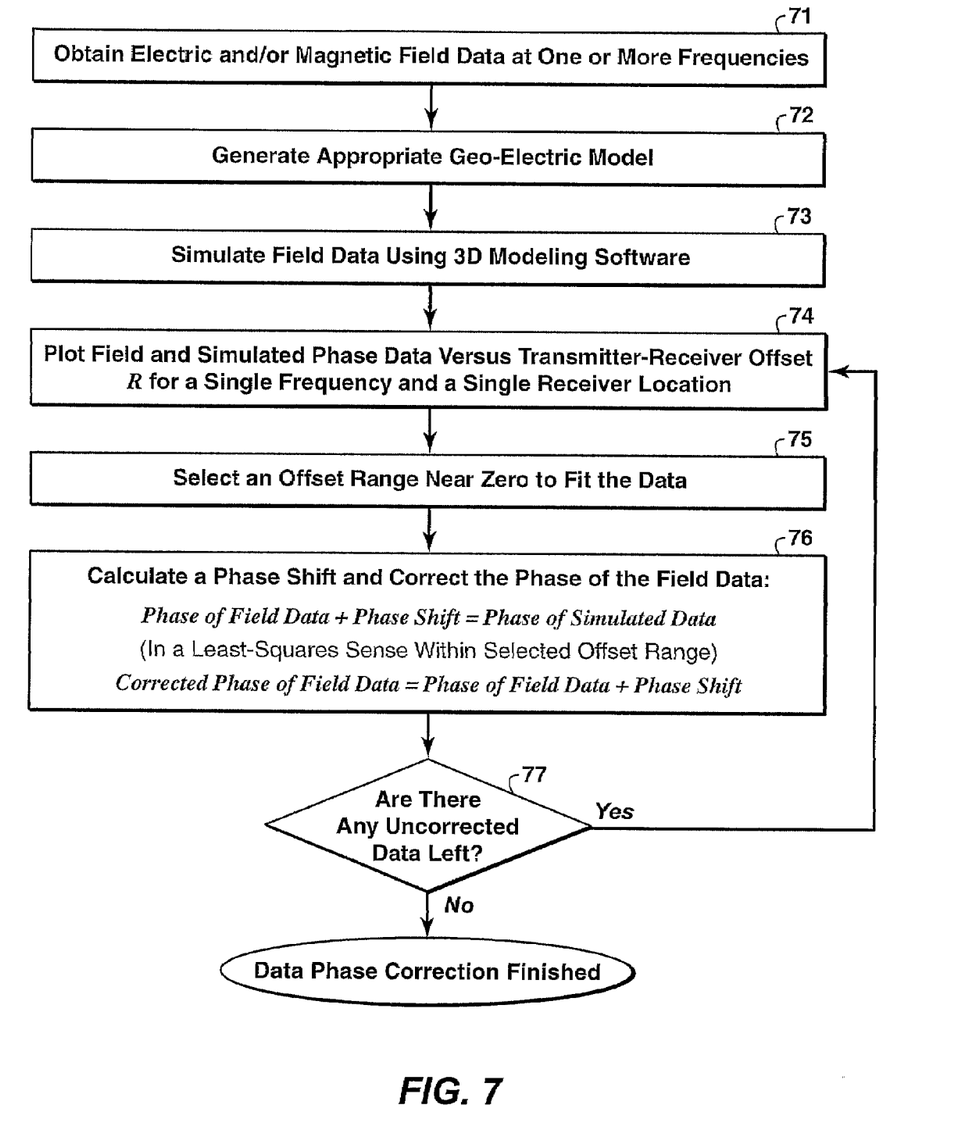
FIG. 7 is a flowchart showing steps in one embodiment of the present inventive method.

The basic steps of one embodiment of the present inventive method for correcting the phase of MCSEM data are shown in the flowchart of FIG. 7. At step 71, the MCSEM data are obtained. If the source signal includes more than one frequency with significant amplitude in its frequency spectrum, the electromagnetic data must be transformed into the frequency domain in order to be able to identify the data values corresponding to each frequency. The impact of equipment-specific parameters such as the transmitter current and antenna length and the receiver antenna length and response function is optionally removed from the data or included in the subsequent numerical modeling step. At step 72, a suitable geo-electric model is built taking into account survey design, water and earth conductivity using geological modeling software on a computer. A geo-electric model is a numerical representation of the complex conductivity, magnetic permeability, and dielectric permittivity structure of the earth. It may include only vertical variation or may vary in all three dimensions and may include a layer of air at the top. In most cases, the magnetic permeability can be taken to be $4\pi \times 10^{-7}$ H/m and the dielectric permittivity to be $8.85 \times 10^{-12}$ F/m. At step 73, three-dimensional numerical modeling is performed on a computer to generate electromagnetic field data using field transmitter and receiver positions and transmitter operating parameters. Three-dimensional modeling is required to most accurately simulate the effects of transmitter orientation, receiver orientation, and transmitter-receiver offset on the synthetic data; however, the invention is not limited to 3D models or simulation. Persons skilled in the art will recognize that the computer software is written to solve Maxwell's electromagnetic field equations for the media represented by the geo-electrical model. Methods for solving Maxwell's equations given a geo-electric model of the earth have been discussed in the literature (G. A. Newman and D. A. Alumbauch, "Frequency-domain modeling of airborne electromagnetic responses using staggered finite differences," *Geophysical Prospecting*, 43, 1021-1042 (1995)) and are encapsulated in commercially-available software packages such as the COMSOL Multiphysics package available from COMSOL Inc., 744 Cowper Street, Palo Alto, Calif. Step 74 consists of plotting the phase of both the measured electromagnetic field data from step 71 and the simulated data from step 73 versus R for a single angular frequency and for a selected receiver location. R is the (signed) horizontal offset between transmitter and the selected receiver and ω is the angular frequency. At step 75, the offset range near zero is selected where the phase shift will be computed. At step 76, a phase shift is computed as a scalar value which will provide the best fit in some suitable norm (least-squares, for example) to the simulated data within the selected interval:

Phase of field data+Phase Shift=Phase of simulated data

The corrected phase of the field data is:

Corrected phase of field data=Phase of field data+ Phase Shift

The phase shift computed over this selected interval is applied to all of the data collected by this receiver at this frequency during this tow line, including data outside the selected interval. Then the process of correction (steps 74-76) may be repeated for all selected frequencies and receivers (step 77), which amounts to cycling through steps 74-77 until the data are all corrected. The result is that the phase of the corrected field data matches the phase of the simulated data at small transmitter-receiver offset.

In a more general formulation of the invention, step 74 may be performed by any method of comparing measured survey data to simulated data; i.e., although plotting is a very useful way to compare, the data do not necessarily have to be plotted together, or plotted at all, to make the comparison. Moreover, the data compared may alternatively represent a single source location and different receiver locations. In other words, in these embodiments, the method looks at different offsets (transmitter-receiver spacing) with either transmitter (i.e., source) location or receiver location fixed. In yet other embodiments, the different offsets may be obtained from different source and receiver locations, i.e., neither source location nor receiver location is held fixed. An example of the latter type of embodiment might be N different source locations paired up with N different receiver locations in such a way that all offsets are different. The situation of a fixed transmitter with many receivers or, alternatively, a fixed receiver and many transmitters are the most computationally efficient.

A similar process can be applied to the amplitude of field data if necessary. In this case, however, a multiplicative scale factor is computed to adjust the measured data:

Corrected amplitude of field data=Amplitude of field data*Amplitude scale factor If it is not otherwise known from direct measurement or from geologic knowledge of the area, the shallow sediment conductivity can be determined by selecting a conductivity which gives the best match between field and synthetic data at near offsets over a range of angular frequencies.

Figure 8:
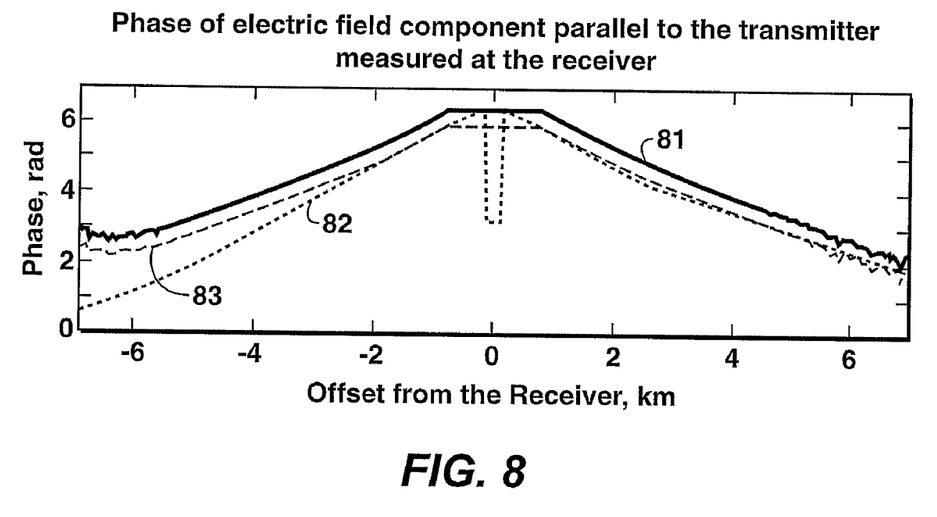
FIG. 8 compares field and simulated data before and after phase correction by the present inventive method.

When a transmitter is located very close to the receiver, the electronics in the receiver may become saturated by very big electromagnetic field. As a rough general rule, offsets in the range of 0.5 to 2.0 km. are most useful for developing phase and amplitude corrections by means of this invention. Stated more generally, a useful offset range may often be up to about 1.5 km beyond the saturation zone on either side of that zone, but excluding the saturation zone. By restricting the analysis to these small offsets, the computed phase shift or amplitude scale factor will depend primarily on the seawater and shallow sediment conductivities and be relatively insensitive to the deeper details of the geo-electric model. The method is not limited to either a static or moving electric dipole transmitter. Other possible transmitters include, but not limited to: static or moving electric pole, magnetic dipole, electric loop, and arrays of all the above-listed transmitters. By way of example, FIG. 8 shows horizontal inline electric field phase data at given receiver for a single frequency. The solid line 81 represents recorded field data, while the dashed line 82 shows simulated data, and the other dashed line 83 shows corrected recorded field data after application of the invention. Differences between the corrected line 83 and the simulated line 82 at offsets greater than about 2 km are indicative of differences between the approximate geo-electric model used in the invention and the actual geo-electric properties of the earth. Remaining differences such as these are the subject of subsequent analysis, such as interpretation or inversion.

The person skilled in the art of electromagnetic data processing and interpretation will readily recognize variations and embellishments of the basic method exemplified by FIG. 7, all of which are intended to be within the scope of the present invention. Among these are the following:

1. Plotting and using data from more than one vector electromagnetic field component to determine the phase error or amplitude scale factor.
2. Using redundant data from the same vector component in determining the phase error or amplitude scale factor. Receivers are currently available that make redundant measurements of some field components.
3. Using data from both the electric and magnetic fields.
4. Measuring the offset distance that is used along the tow line of the transmitter.
5. Further decomposing the errors into surface-consistent errors by a least-squares method (See, for example, M Taner and F. Koehler, "Surface consistent corrections," *Geophysics* 46, 17-22 (1981).) Each surface-consistent phase error is the sum of a phase error associated with the transmitter and a phase error associated with the receiver. Each surface-consistent amplitude scale factor would be the product of an amplitude scale factor associated with the transmitter and an amplitude scale factor associated with the receiver.
6. Using the errors determined by the basic method or by the variation No. 5 above to correct data not originally used to determine those errors. As a particular example, the phase errors determined by the basic method could be applied to other receivers on the same tow line and the surface-consistent errors found by variation No. 5 could be applied to data that were not part of the original data-fit calculation.
7. Using the present inventive method together with other techniques used to increase the reliability of the data amplitude and phase, such as compensating receiver clocks for drift, adjusting for transmitter variations, applying receiver calibrations, and applying a correction based on frequency scaling.
8. Any of the above techniques, where corrections are determined separately for different vector components of the data; and,
9. Any of the above techniques, where the corrections determined from one vector data component are applied to other vector components.
10. Using the techniques in variations Nos. 5 or 6 above to identify unreliable data, which may then be discarded from further interpretation or inversion.

Variation No. 5 above warrants additional explanation. The requirement that measured data have phase and amplitude adjusted to be consistent with simulated data at near offsets is valid whether or not the tow line passes directly over the receiver. However, for tow lines well away from a receiver, near offsets may not be available. As a result, it may be preferable to phase- and amplitude-correct those gathers based on receiver-specific and towline-specific corrections generated from other, near-offset data.

Experts in CSEM data analysis will recognize that ambiguous situations can arise for exceptional combinations of phase, frequency, and receiver orientation. For example, a transmitted square wave contains the frequencies 1/T, 3/T, 5/T, etc. where T is the waveform period. If T=4 seconds for example, then a timing error of 2 seconds will result in phase shifts of exactly 180° for every frequency. Experts will further recognize that phase shifts of 180° (or −1) are equivalent to 180° changes in the orientation of the horizontal receiver antennae. Experience has shown that it is sometimes necessary to compare phase corrections for multiple tow lines over the same receiver in order to unambiguously separate the effects of receiver orientation from phase error.

CSEM receivers such as that shown in FIG. 4 generally have a finite dynamic range. That is, overly large electric or magnetic fields will saturate the digitizers so that the recorded digital data will be clipped between some maximum and minimum values. This situation generally occurs when the source passes within a few hundred meters of the receiver, the exact distance varying with the strength of the transmitter. Those skilled in analyzing CSEM data will easily recognize this saturation zone and ignore that offset range while practicing the present invention.

The foregoing application is directed to particular embodiments of the present invention for the purpose of illustrating it. It will be apparent, however, to one skilled in the art, that many modifications and variations to the embodiments described herein are possible. For example, the invention is described in terms of marine CSEM survey data, but the method can be applied to data collected on land or using airborne technique. Also, the geo-electrical model and the simulation of electromagnetic responses may be either one, two or three-dimensional, including the so-called two and one-half dimensional approximation in which the model is assumed to be unchanging along just one direction. The amplitude and phase correction of the present invention is preferably performed at least partly on a computer, i.e., computer-implemented embodiments of the present inventive method are preferred, but not essential. All such modifications and variations are intended to be within the scope of the present invention, as defined in the appended claims.

The invention claimed is:

1. A computer implemented method for estimating error in measured data from a controlled-source electromagnetic survey of a subsurface region, comprising:
   (a) selecting data from the electric or magnetic field survey data, said selected data corresponding to a plurality of different offsets, wherein the term offset means source-receiver spacing, and to a selected single frequency in the source's signal's frequency spectrum;
   (b) generating a geo-electric model of the subsurface region, said model including at least resistivity or conductivity as a function of position in the region;
   (c) using a programmed computer to solve electromagnetic field equations to simulate the survey's electromagnetic responses for said selected frequency and for source and receiver locations corresponding to said selected data, using the geo-electric model of the subsurface region and survey source parameters;
   (d) selecting a near-zero offset range; and
   (e) estimating data error at all offsets by comparing measured survey data to simulated data at one or more offsets within said selected range of near-zero offsets, said estimated error providing a means for correcting measured data.

2. The method of claim 1, wherein the survey data obtained are phase data.

3. The method of claim 2, wherein the estimating data error step results in a single phase shift which can be applied to correct measured phase data.

4. The method of claim 1, wherein the survey data obtained are amplitude data.

5. The method of claim 4, wherein the estimating data error step results in a single amplitude scale factor which can be applied to correct measured amplitude data.

6. The method of claim 1, wherein the error is estimated by data fitting in a selected norm such as least-squares for at least one offset within said selected range of near-zero offsets.

7. The method of claim 1, wherein said geo-electric model also includes at least one of a group consisting of complex conductivity, permeability and permittivity, each as a function of position in the subsurface region.

8. The method of claim 1, further comprising repeating steps (a)-(e) for all source and receiver locations in the survey and for all frequencies in the source's frequency spectrum having associated amplitude within a pre-selected range.

9. The method of claim 8, wherein the same geo-electric model is used for each repetition of steps (a)-(e).

10. The method of claim 1, further comprising plotting measured and simulated data vs. offset and using the plot to select the near-zero offset range and to estimate the data error over said range.

11. The method of claim 1, wherein the near-zero offset range is from about −2 km to about +2 km but excluding a near-zero sub-range determined based on observation of receiver saturation effects within said sub-range.

12. The method of claim 1, wherein said geo-electric model and said simulation of electromagnetic responses are three dimensional.

13. The method of claim 1, wherein said selected survey data are recorded at a single receiver location.

14. The method of claim 1, wherein said selected survey data correspond to a single source location.

15. A method for producing hydrocarbons from a subsurface region, comprising:
   (a) performing a controlled-source electromagnetic survey of the subsurface region;
   (b) obtaining data from said survey, corrected for error by the method of claim 1;
   (c) using the corrected data to identify a layer showing a resistivity anomaly indicating presence of hydrocarbons; and
   (d) drilling a well into said anomalous layer and producing hydrocarbons.

16. The method of claim 15, wherein the survey data corrected are phase data.

17. The method of claim 15, wherein the survey data corrected are amplitude data.

* * * * *